Figure 1:
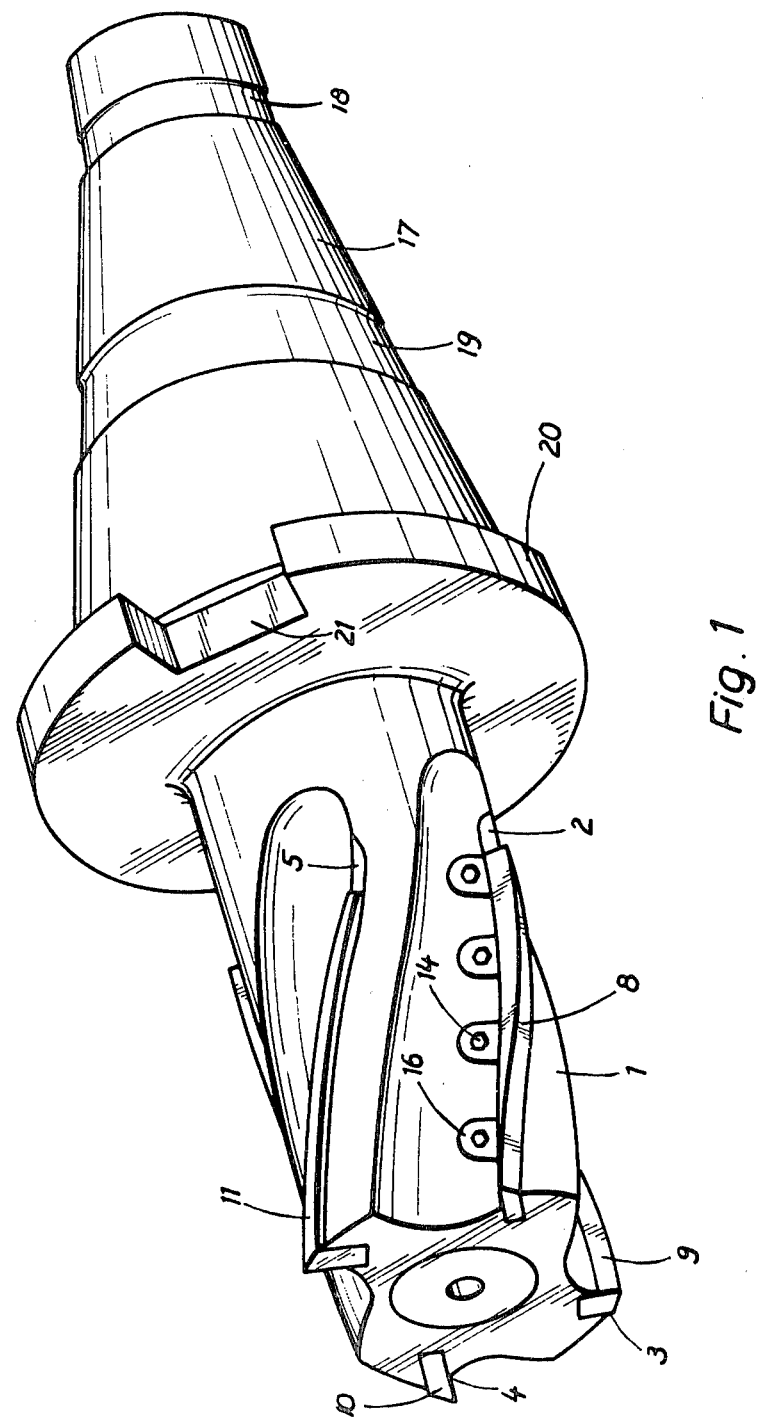

United States Patent [19]

Hoffmann et al.

[11] 4,219,292

[45] Aug. 26, 1980

[54] ROTARY HELICAL MILLING CUTTER WITH REPLACEABLE CUTTER BIT ELEMENTS

[75] Inventors: Friedrich Hoffmann, Tübingen; Werner Gräfe, Reutlingen; Siegfried Deiss, Tübingen; Willy Schlotterer, Nehren, all of Fed. Rep. of Germany Rep. of Germany

[73] Assignee: Montanwerke Walter GmbH, Tübingen, Fed. Rep. of Germany

[21] Appl. No.: 18,265

[22] Filed: Mar. 7, 1979

[30] Foreign Application Priority Data

Mar. 17, 1978 [DE] Fed. Rep. of Germany ....... 2811680

[51] Int. Cl.² .............................................. B26D 1/12
[52] U.S. Cl. ......................................... 407/63; 407/45
[58] Field of Search ...................... 407/30, 44, 45, 46, 407/49, 61, 63

[56] References Cited

U.S. PATENT DOCUMENTS

| | | | |
|---|---|---|---|
| 2,207,909 | 7/1940 | Besaw | 407/45 |
| 3,175,276 | 3/1965 | Weber et al. | 407/46 |
| 3,672,017 | 6/1972 | Nielson et al. | 407/63 |
| 3,715,788 | 2/1973 | Ayer | 407/63 |

*Primary Examiner*—Harrison L. Hinson
*Attorney, Agent, or Firm*—Frishuaf, Holtz, Goodman & Woodward

[57] ABSTRACT

To permit resharpening of cutter blades of a helical milling cutter, the cutter blades or bits of a multi-bit cutter have decreasing thickness, and are placed in grooves having the same helix radius, but the centers of the helical axes offset from the center of rotation of the cylindrical cutter body in the direction towards the associated groove, so that cutter blades of lesser thickness are still seated firmly in the bottom of the respective groove. Upon dulling of the cutters, the thinnest one of the cutter blades is discarded, the thickest one only replaced and the worn blades moved up one step along the circumference of the body into grooves which are progressively more shallow, to compensate for decrease in thickness of the respective cutter bits upon regrinding to resharpen the bits.

10 Claims, 3 Drawing Figures

ROTARY HELICAL MILLING CUTTER WITH REPLACEABLE CUTTER BIT ELEMENTS

The present invention relates to a rotary milling cutter having helical cutter bits, and more particularly to such a milling cutter in which the cutter bits are replaceable to permit placement of sharp, fresh cutter bits on the cutter after extended use.

BACKGROUND AND PRIOR ART

It has previously been proposed to make rotary milling cutters with helical cutter bits in such a manner that the cutter bits are replaceable. They are removable for replacement by fresh, newly sharpened cutter bits. The cutter element itself is formed of a generally cylindrical body with grooves therein into which the cutter bits can be inserted and then clamped in position. The cutter bits are generally helical. A helical milling cutter of this type is shown in U.S. Pat. No. 3,672,017, having helical cutter elements of identical size and shape which are inserted in a corresponding number of helically extending longitudinal grooves. The cutter bits are clamped therein. The seats for the cutter bits accurately match the shape of the cutter bits themselves. After use of the cutter, the bits become dull and can then be replaced with new bits having a sharp edge. The body of the milling cutter itself need not be changed.

It has also been proposed to make rotary helical milling cutters in such a manner that the cutter elements themselves can be reground and sharpened after use. The cutter plates, which are replaceable, after sharpening, are repositioned by placing of shims thereunder and by radially shifting the cutter bits by using screws and the like. The cutter bits are thereby shimmed and clamped outwardly to such an extent that the decrease in size of the bit itself, due to the sharpening by grinding, is effectively compensated. Since the cutter bits are helically twisted, however, radial shifting can be effected only in one of the many directions which the cutter bit itself has. Thus, shifting of the cutter bit on the milling cutter body will leave voids and gaps beneath the cutter bit and the rear seating surface of the body, or the associated side wall or axially extending helical groove. Consequently, the cutter bit will no longer bear with its entire rear surface against the rear groove of the milling cutter body itself but will be supported to some extent bridge-like over gaps. The bottom surfaces of the longitudinal groove and the lower limiting surface of the cutter bits also may have gaps and voids therebetween, of varying height, and not necessarily corresponding to the amount by which the reground cutter bit has been repositioned.

The cutter bits usually are made of very hard metal, for example tungsten carbide or the like, and are generally brittle. Thus, if the cutter bits do not bear with their rear surfaces against the body of the milling cutter throughout their full length, they have the tendency to break or snap in use, or already upon being clamped in position.

THE INVENTION

It is an object to provide a helical rotary milling cutter with replaceable cutter bits in which the cutter bits can be sharpened after use and repositioned without incurring the danger of voids, gaps, or other hollow spaces being bridged by the cutter bit, thus eliminating the danger of breakage upon clamping or in use.

Briefly, the cutter bit is so constructed that the helical axes of at least one of the grooves in which the cutter bits are placed are radially offset from the center of rotation of the cylindrical body in the direction towards the associated groove. Thus, the respective cutter bits, when the cutter element is first placed in use, are not identical, but have progressively smaller thicknesses, corresponding to the offset, in radial direction, of the center of the helix defined by the respective cutter bit. After some use, and when it is desired to regrind the cutter bit, it is then possible to replace the thickest one of the original cutter bits with a new one, and use the thickest one, after regrinding, in the position of the next adjacent thinner one, and so on down the line, discarding only the last or thinnest one which was originally furnished. Thus, the life of the overall milling cutter is extended by a factor corresponding to the number of individual replaceable cutter bits, each regrinding or resharpening with consequent decrease in the thickness of the respective cutter bit requiring, however, replacement only of one cutter bit, namely that of the thickest one of the assembly. Usually, and in accordance with a preferred embodiment, the helix axis of the thickest one of the cutter bit and the axis of rotation of the milling cutter are coincident.

Radial shifting of the center of the helix permits use of the original cutter bit, after a reduction in thickness, and positioning at the outwardly off center position without introducing gaps, voids, or empty spaces which are being spanned by the cutter element as such. Thus, when the cutter bit is clamped in the milling cutter, there is no danger of breakage of the cutter bit during clamping, or later on in use. The clamping arrangement itself can be of any well known and suitable type. Preferably, the helical axes are offset consecutively in the direction of the half angle of the angle which is defined by the forward and rear end of the outer surface of the cutter bit facing in the direction of rotation of the cutter.

In accordance with a preferred embodiment, the radial offset of the helical axes of the cutter bits increase from a smallest value, counter the direction of rotation of the cutter, and starting from that one of the cutter bits which has its helical axis coincident wit the axis of rotation of the milling cutter. The respective offset of the helix axis of the respective offset cutter elements preferably increases by the same amount from cutter bit to succeeding cutter bit.

Figure 2:
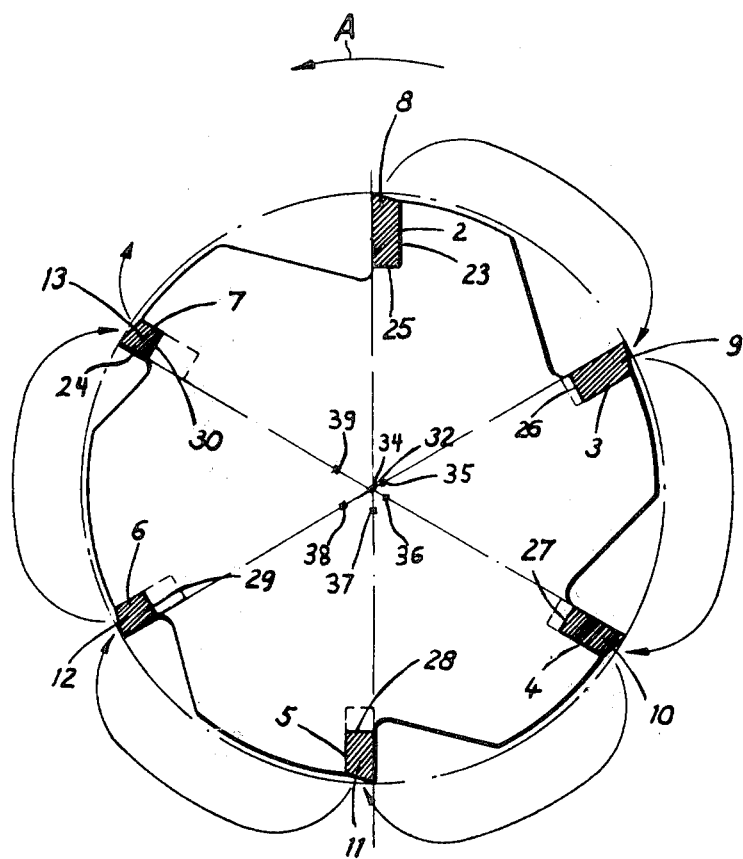
Figure 3:
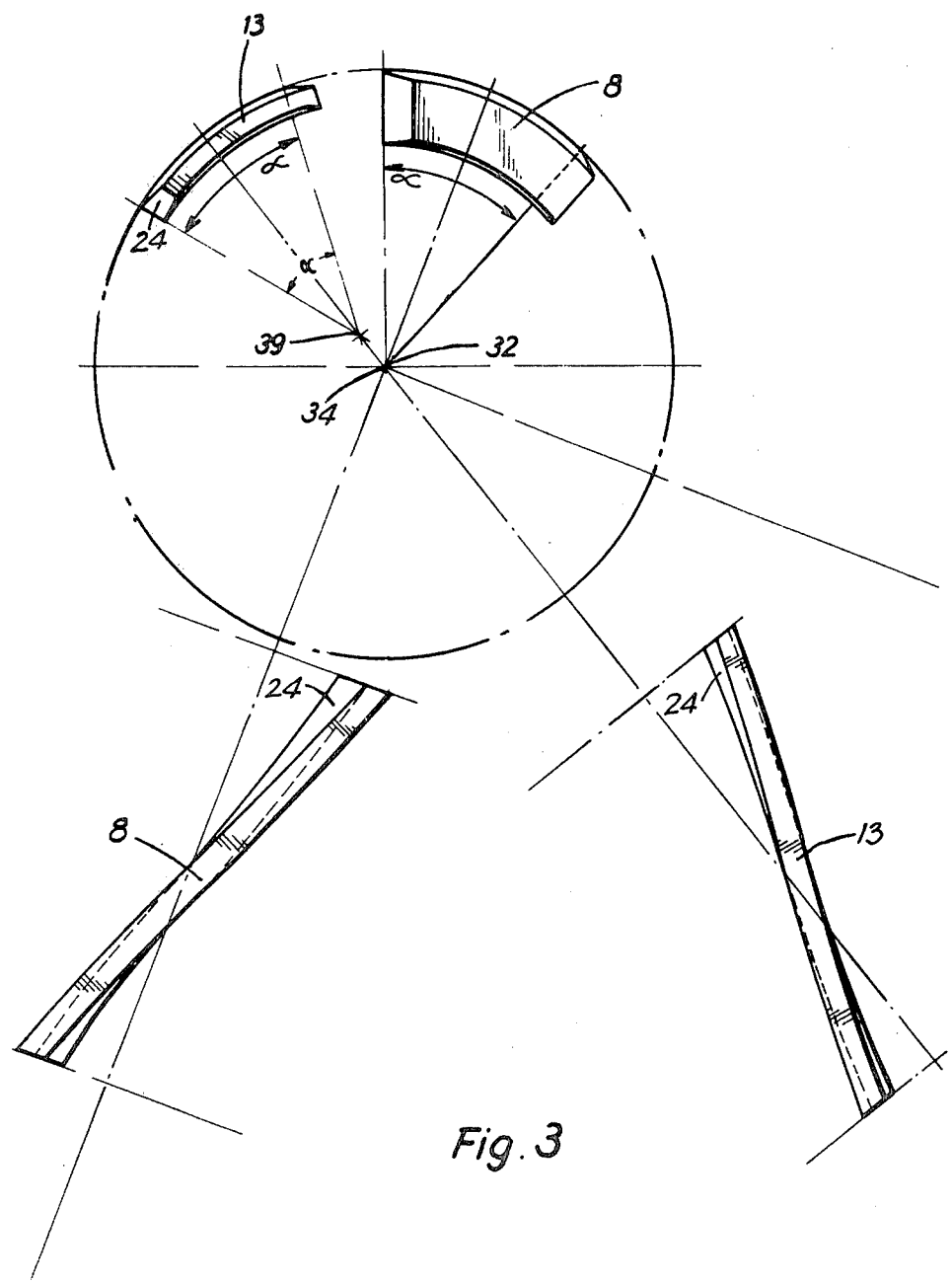

Drawings, illustrating a preferred example, wherein:

FIG. 1 is a highly schematic perspective view of a rotary milling cutter having four replaceable cutter bits;

FIG. 2 is an end view, partly in section, of a milling cutter of the type shown in FIG. 1 and having six cutter bits; and FIG. 3 is a geometric schematic representation of the relationship of two cutter bits in accordance with FIG. 1 and showing a fragmentary schematic end view, from which all cutter bits except two have been removed with the associated developed views of the cutter bits to illustrate the geometry of the arrangement.

The milling cutter (FIG. 1) has a generally cylindrical base or support body 1 having for helically extending longitudinal grooves 2, 3, 4, 5, in which associated helical cutter bit or blade elements 8, 9, 10, 11 are clamped. Clamp elements 16, secured by screws 14 to the body, clamp the cutter bits 8–11 in the respective grooves, in accordance with any well known and suitable structure. The clamping screws 14 and clamp elements 16 permit rapid and reliable interchange of cutter elements 8–11. These cutter elements, as is customary, are of hard cutting metal.

The cutter head body 1 is secured, in standard form, to an attachment portion formed by a cone 17 having two locating grooves 18, 19, and a transport flange 20 formed with engagement notches 21.

The invention will best be understood by reference to FIG. 2: The cutter here shown has six blade elements 8–13 which are held by suitable clamp elements 14, 16 (not shown in FIG. 2) in respective grooves 2–7. As can be clearly seen in FIG. 2, the radial thickness of the helical cutter blade elements 8–13 varies; correspondingly, the bottom of the respective groove 2–7 has a different dimension from the center of rotation 32 of the body 1.

The direction of rotation of the milling cutter is indicated by arrow A. Each one of the six longitudinally extending helical grooves 2–7 has a helically twisted side wall 23, facing the direction of rotation (arrow A) against which the rear wall of the respective cutter bit 8–13 is firmly engaged. The cutter bits 8–13 are likewise engaged in radial direction against the lower or bottom surfaces 25–30 of the respective grooves 2–7. Thus, the cutter bits are supported both at the bottom, that is, in radial direction, as well as with their rear wall in circumferential direction throughout the entire extent of the respective walls.

As can be clearly seen in FIG. 2, and in accordance with the invention, the bottom surfaces 25–30 of the grooves 2–7 have respectively different distances from the axis of rotation 32 of the milling cutter 1. The distances are so selected that, counter the direction of rotation, and starting from the surface 25 of groove 2, the distance increases uniformly, that is, in uniform steps, up to the bottom surface 30 of the longitudinal groove 7. The radii which are associated with the helical surfaces 26–39 are all the same and correspond to the radius of the bottom surface 25 associated with the helical groove 2, that is, the groove in which the center of rotation of the helix and the center of rotation of the milling cutter are coincident or congruent.

FIG. 3 illustrates, highly schematically, the geometrical arrangements of the bottom surfaces 25–30 of the longitudinal grooves 2–7 and of the respective cutter blades 8–13. FIG. 3 only illustrates two cutter blades, namely cutter blade 8 and cutter blade 13.

The helical shape of the cutter blade is so arranged that the associated helix axis 34 is coincident or congruent with the axis of rotation 32 of the cutter body 1. The longitudinal groove 7 associated with the cutter blade 13, as well as the bottom surface 30 thereof, has a helix axis 39 which is parallel to the axis of rotation 32 of the milling cutter, but offset in radial direction from the axis 32. The distance between the axis of rotation 32 of the cutter and the helix axis 39 corresponds to the difference of the radial distance of the bottom surfaces 25 and 30 from the axis 32. The direction in which the helix axis 39 is offset with respect to the axis of rotation 32 is coincident with the direction of the half angle of that angle which is formed by the forward and rear end of the outer surfaces 24 of the cutter blade 13—looked at in the direction of rotation. This angle is shown as angle $\alpha$ in FIG. 3.

Cutter blades 9, 10, 11, 12 and the respective grooves 3–6 are arranged similarly; only the direction and the extent of radially eccentric offset of the associated axes of the helix 35, 36, 37, 38 (FIG. 2) of the associated cutter bit are different.

When making the milling cutter 1, the grooves 2, 3 . . . 7 are cut into the cutter body with the same associated helix radius, but having the center of the helix radius offset with respect to the axis of rotation 32. It is thus possible to interchange the cutter blades 8, 9, 10, 11, 12, 13 as illustrated in FIG. 2 so that, after use and resharpening, cutter blade 8 is placed into the longitudinal groove 3, cutter blade 9 in groove 4, and so on; and, lastly, cutter blade 12 into groove 7. Cutter element 13 is then no longer used and will be discarded, and a new elements 8 will be introduced into groove 2. The replaced blades in the respective grooves can then be ground to accurate size so that each cutter element can be used six times. In view of the specific geometrical relationship, exchange of a cuter blade 8, 9, 10 . . . n in an adjacent groove will, even after exchange, have an exact fit with respect to the bearing walls 23 at the rear of the cutter blade as well as with respect to the bottom walls 25, 26 . . . 30, without introducing stresses into the cutter blades upon clamping, or during operation, which might damage the cutter blades and/or the workpiece.

Various changes and modifications may be made and the invention is not restricted to any specific number of cutter blades on any milling cutter; thus, gnerally, if n grooves are present, and in which n is greater than 1, the first groove will preferably have a helix axis of rotation congruent with the axis of rotation of the milling cutter, whereas the axes of the respective n-1 grooves will be, progressively, offset in radial direction from the axis of the first cutter, and placed at the center line of the helix, that is, at the bisector of an end surface of the angle of the cutter. The radii of the respective helices will all be the same, and correspond to the radius of the first cutter bit, thereby ensuring tight seating of replaced or interchanged cutter bits in circumferential and radial direction.

I claim:

1. Rotary helical milling cutter having an essentially cylindrical body (1) with helical grooves (2–7) extending in axial direction;
   helical, replaceable cutter bits (8–13) located in the groove;
   and clamp means (14, 16) securing the cutter bits in said grooves,
   wherein, in accordance with the invention,
   the helix axis (34–39) of at least one of the helical grooves (2–7) is radially offset from the center of rotation (32) of the cylindrical body (1) in a direction towards the associated groove.

2. Cutter according to claim 1, wherein at least three grooves are present, two helix axes of the grooves are radially offset, and the radial offset from the center of rotation of the cylindrical body, and the radial offsets of the helix axes of said two grooves are different.

3. Cutter according to claim 1, wherein n grooves are present, in which n is greater than 1;
   n-1 grooves have their helical axes offset, and the offsets of said grooves differ from each other;
   and wherein the helix radius of all said cutter bits is equal.

4. Cutter according to claim 3, wherein the offsets of the grooves progress uniformly as the distances of the respective grooves from a predetermined one groove increases.

5. Cutter according to claim 1, wherein the helix axes (34-39) of the grooves are offset in the direction of the bisector of the angle (α) defined by the forward and rear end of the outer surface (24) of the respective cutter blade (8-13), looked at in the direction of rotation of said cutter body (1).

6. Cutter according to claim 4, wherein the radial offset of the helical axes (34-39) of the grooves increase counter the direction of rotation (A) in succeeding grooves (2-7) from a minimum to a maximum value.

7. Cutter according to claim 6, wherein one of the grooves (2) has a helix axis (34) which is coincident with the axis of rotation (32) of said body (1).

8. Cutter according to claim 6, wherein the radial offset of the helix axes (34-39) changes, in equal steps, with respect to succeeding grooves (2-7).

9. Cutter according to claim 3, wherein one of the grooves (2) has a helix axis (34) which is coincident with the axis of rotation (32) of said body (1).

10. Cutter according to claim 9, wherein the helix axes (34-39) of the grooves are offset in the direction of the bisector of the angle (α) defined by the forward and rear end of the outer surface (24) of the respective cutter blade (8-13), looked at in the direction of rotation of said cutter body (1).

* * * * *